Aug. 14, 1934.　　　L. R. RUNALDUE　　　1,970,103
CONTROL SYSTEM
Filed March 25, 1932
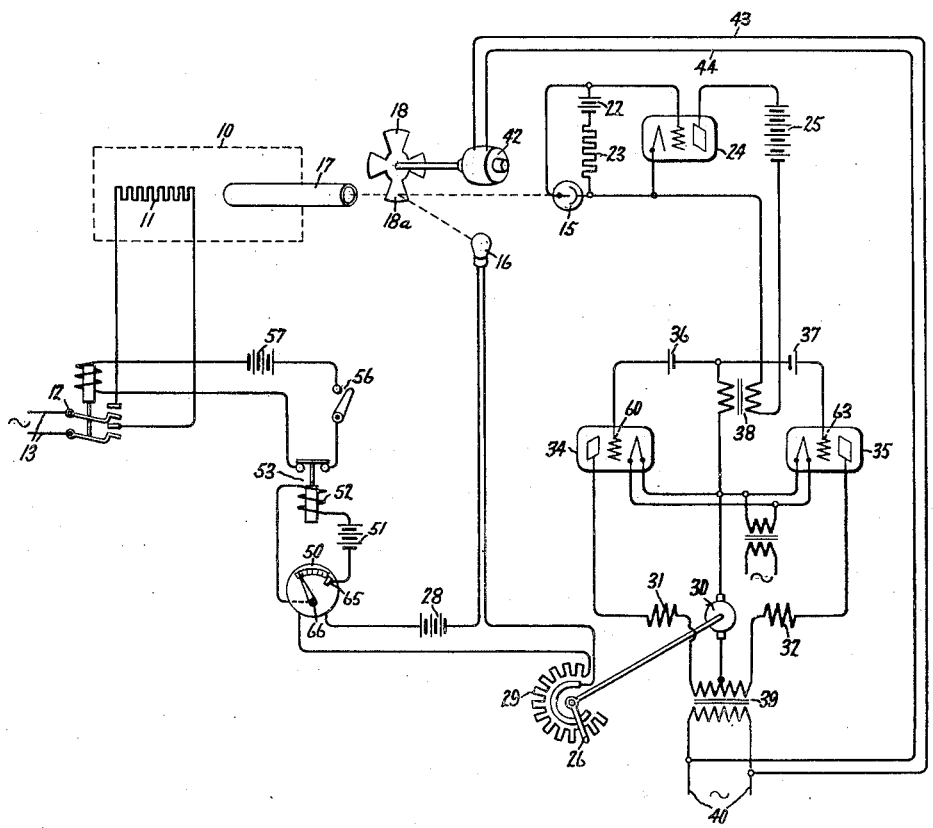
Inventor:
Lewis R. Runaldue,
by Charles W. Tullar
His Attorney.

Patented Aug. 14, 1934

1,970,103

UNITED STATES PATENT OFFICE 1,970,103

CONTROL SYSTEM

Lewis R. Runaldue, Pittsfield, Mass., assignor to General Electric Company, a corporation of New York Application March 25, 1932, Serial No. 601,169

4 Claims. (Cl. 250—41.5)

My invention relates to temperature measuring and controlling systems wherein the temperature of a heated object may be measured and controlled in accordance with variations in radiant energy therefrom, and has for an object the provision of a simple and reliable means for varying the input energy to an electric furnace to maintain the temperature of the furnace at a predetermined value.

In order to insure great accuracy in the measurements of the temperature, provision must be made for the elimination of errors introduced by the non-uniform response of the light sensitive device to a given amount of radiant energy. Heretofore errors in the light sensitive device have been eliminated by comparing the radiation from the furnace with that from a standard source of light. My invention, however, comprehends the elimination of any refinements necessary to maintain a standard source of light at a given intensity.

In accordance with my invention in one form thereof, I provide a light sensitive device which alternately receives light from a source to be measured, and from a standard light source, the intensity of which is controlled in response to difference in intensity between the two sources. More particularly, a motor operated rheostat or the like controlled by the light sensitive device and cooperating electric valves provides for the control of the intensity of the light from the standard so that it remains equal at all times to the radiation from the furnace. Consequently, the filament current of the standard provides a direct measurement of the temperature of the furnace. It is further contemplated that the rate of heat generation may be controlled in response to variations in the filament current of the standard.

For a more complete understanding of my invention, reference should now be had to the accompanying drawing, which shows diagrammatically my invention as applied to a temperature control system for a furnace.

Referring to the drawing, I have shown my invention in one form as applied to the measurement of the temperature and to the control of an electric furnace 10 provided with a heating resistor 11, which is arranged to be connected by the contactor 12 to a suitable source of electric current supply as indicated by the supply lines 13. The temperature of the furnace is measured and controlled by the response of a light sensitive device 15, first to the light or radiant energy from the furnace 10, and then to the light or radiant energy from a standard source 16. A tube 17 extending within the furnace 10 may be directed to a point on the wall of the furnace and, as will be understood by those skilled in the art, the intensity of the light passing through the tube 17 will vary with the temperature of the furnace. The light from these two sources is alternately thrown upon the light sensitive device 15 by means of a sectored disc 18. In the position shown, it will be seen that the light from the standard 16 is directed on a light sensitive device 15 by means of a reflecting surface provided on the segment 18a of the sectored disc 18. If the disc be rotated 45 degrees, it will be observed that the light sensitive device 15 will then receive light directly from the furnace. A difference in potential is produced across the light sensitive device 15 by means of a battery 22 and the resistance 23. Preferably an amplifier 24 is utilized to augment the response of the light sensitive device to the radiant energy from either of the sources. The anode potential for the amplifier 24 is supplied by a suitable source of voltage shown as a battery 25. The intensity of the standard light source 16 is controlled by a motor operated rheostat 29 in conjunction with the source of supply 28 shown as a battery. A direct current motor 30 is provided with field windings 31 and 32 respectively arranged for forward and reverse operation. The energization of the motor 30 is controlled by means of a pair of electric valves 34 and 35. These valves are preferably of the type having an inert gas such as mercury vapor within their envelopes, and sometimes termed as grid controlled arc rectifiers. It will be understood that when the grid of each valve is made sufficiently positive with respect to its anode, the valve becomes conductive. As shown, the batteries 36 and 37 are connected in the grid circuit so as to maintain the grids sufficiently negative normally to prevent the passage of current through the valves. The output of the amplifier 24 is connected through a grid transformer 38 so as to render the valves 34 and 35 conductive under certain conditions of operation. The anode supply for the valves 34 and 35 is obtained through a transformer 39 from a suitable source of alternating current supply indicated by the supply lines 40. A synchronous motor 42 is arranged to drive the sectored disc 18 and it will be observed that it receives its operating current by conductors 43 and 44 from the source of supply so provided for the anode or output circuit of the electric valves 34 and 35. A contact making ammeter 50 serves to measure the filament current of the standard light source 16, and in conjunction with a battery 51 serves to control the energization of an operating coil 52 provided on a relay 53.

With the above understanding of the elements and their organization with respect to each other in the system, the operation of the system itself and the manner in which the light sensitive device 15 is used to measure and control the temperature of the furnace 10 due to the balancing of the radiant energy from the standard 16 against the radiant energy from the furnace will be readily understood from the description which follows:

It will be assumed that the supply lines are suitably energized as indicated by the well understood symbols for alternating current. A manually operable switch 56 may then be closed to complete an energizing circuit through the battery 57 for the contactor 12. This contactor thereupon operates to connect the heating resistor 11 to the alternating current source of supply 13. The synchronous motor 42 is arranged to rotate the sectored disc 18 so that light is reflected from the reflecting surfaces of the disc to the light sensitive device 15 during the time that maximum voltage for one half cycle is applied to the anodes of the valves 34 and 35. For the next half cycle light is received by the device 15 from the furnace. The speed of the synchronous motor is selected so that the frequency of light pulsations falling upon the light sensitive device is the same as the frequency of the supply current. As long as the radiant energy received by the light sensitive device 15 from the furnace 10 and the standard 16 is constant, no change in potential will be produced by the transformer 38 on the grid 60 of the valve 34 or on the grid 63 of the valve 35. However, if the radiant energy from the furnace should be less than that from the standard, an alternating voltage will be produced on the secondary of the grid transformer 38. The polarity of the grid transformer 38 may be selected so that the grid 60 is rendered positive with respect to the anode of the valve 34, whenever the radiant energy from the standard 16 exceeds the radiant energy from the furnace. The valve 34 will thereby be rendered conductive to energize the motor 30 and its field winding 31 in a direction to rotate the conducting member 26 in a counter-clockwise direction. The motor 30 will continue to be energized until sufficient resistance has been inserted in the circuit of the standard light source 16 to cause the light emitted from the standard to equal the light or radiant energy from the furnace.

Should the radiant energy of the furnace exceed the radiant energy from the standard, an alternating voltage will appear on the secondary of the grid transformer 38 which is displaced 180 degrees with respect to the voltage produced when the radiant energy from the standard exceeded that from the furnace. Consequently, the electric valve 35 is rendered conductive to energize the motor 30 and its field winding 32 for rotation in a clockwise direction. The motor will continue to rotate thereby decreasing the resistance in series with the standard light source 16 until the relative intensities of the two sources are again equal.

The variations in the filament current of the standard light source are measured by means of the ammeter 50, and it will now be apparent that this ammeter may be calibrated in degrees of temperature of the furnace. If a contact 65 is secured to the dial of the ammeter at some point corresponding to a desired temperature of the furnace, the temperature may be regulated. For example, as the conducting indicator 66 engages the contact member 65 an energizing circuit is completed for the relay 53. The consequent operation of this relay to its open position serves to deenergize the contactor 12 thereby interrupting the supply of heating current to the heating resistor 11.

It will of course be understood that any suitable type of contact making ammeter may be employed for the regulation of the temperature of the furnace, or any other device which is responsive to the changes in filament current or voltage of the standard 16.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In a material modifying apparatus the combination with a reversible electric motor, a pair of grid controlled electric valves arranged to control the energization of said motor, means for obtaining light from said apparatus, the intensity of which varies in accordance with a condition of operation of said apparatus, a second light source, intensity varying means for said second source comprising means actuated by said motor for varying the intensity of said second light source, and means for selectively rendering one or the other of said valves conductive in accordance with which light source is of greater intensity until said motor actuates said intensity varying means to cause the intensity of said second source to equal the intensity of the light from said apparatus.

2. The combination of a reversible electric motor, a pair of grid controlled electric valves arranged to control the energization of said motor, a source of alternating current supply for the anode circuits of said valves, a light source of variable intensity, a second light source, means controlled by said motor for varying the intensity of said second light source, means for impressing an alternating voltage on the grid circuits of said valves varying in phase relation with respect to said anode circuit supply source in accordance with the relative intensity of the light from said sources to render one or the other of said valves conductive whereby the motor is controlled to cause the intensity of said second source to equal the intensity of said first source, and means responsive to a condition of operation of said second source for measuring the light intensity of said first source.

3. Means for controlling the temperature of a heating device having light emitting characteristics varying with a condition of operation, comprising a source of light, a motor, control means operable by said motor for varying the intensity of said source, a light sensitive device arranged to receive alternately light from said heating device and from said source of light, a pair of grid controlled electric valves arranged to control the energization of said motor, a source of alternating current supply for the anode circuits of said valves, and means for impressing an alternating voltage on the input circuits of said valves varying in phase relation with respect to said anode voltages in accordance with the relative intensities of the light from said light source and from said heating device so as to render one or the other of said valves conductive whereby said motor operates said control means until the intensity of said light source equals the intensity of said device.

4. In combination, a furnace having light emitting characteristics varying with its temperature, heating means for said furnace, means for controlling the temperature of said furnace comprising a light source, a pair of grid controlled electric valves, a source of alternating current voltage for the anode circuits of said valves, a motor arranged to be energized by one or the other of said valves for forward or reverse operation, means operated by said motor for varying current flow to said light source, means responsive to a predetermined flow of current to said light source for varying the rate of heat generated by said heating means, and means alternately responsive to light rays from said furnace and from said light source for varying the phase relation between the grid and anode voltages of said valves thereby to render one or the other of said valves conductive until the intensity of the light from said source equals the intensity of the light from said furnace.

LEWIS R. RUNALDUE.